Dec. 19, 1950    F. CAROSELLI    2,534,338
AUTOMATIC ETCHING APPARATUS
Filed Nov. 20, 1948    10 Sheets-Sheet 1

FIG. I

INVENTOR
F. CAROSELLI
BY J. A. McCorkindale
ATTORNEY

Dec. 19, 1950 F. CAROSELLI 2,534,338
AUTOMATIC ETCHING APPARATUS
Filed Nov. 20, 1948 10 Sheets—Sheet 3

INVENTOR
F. CAROSELLI
BY J. A. McCorkendale
ATTORNEY

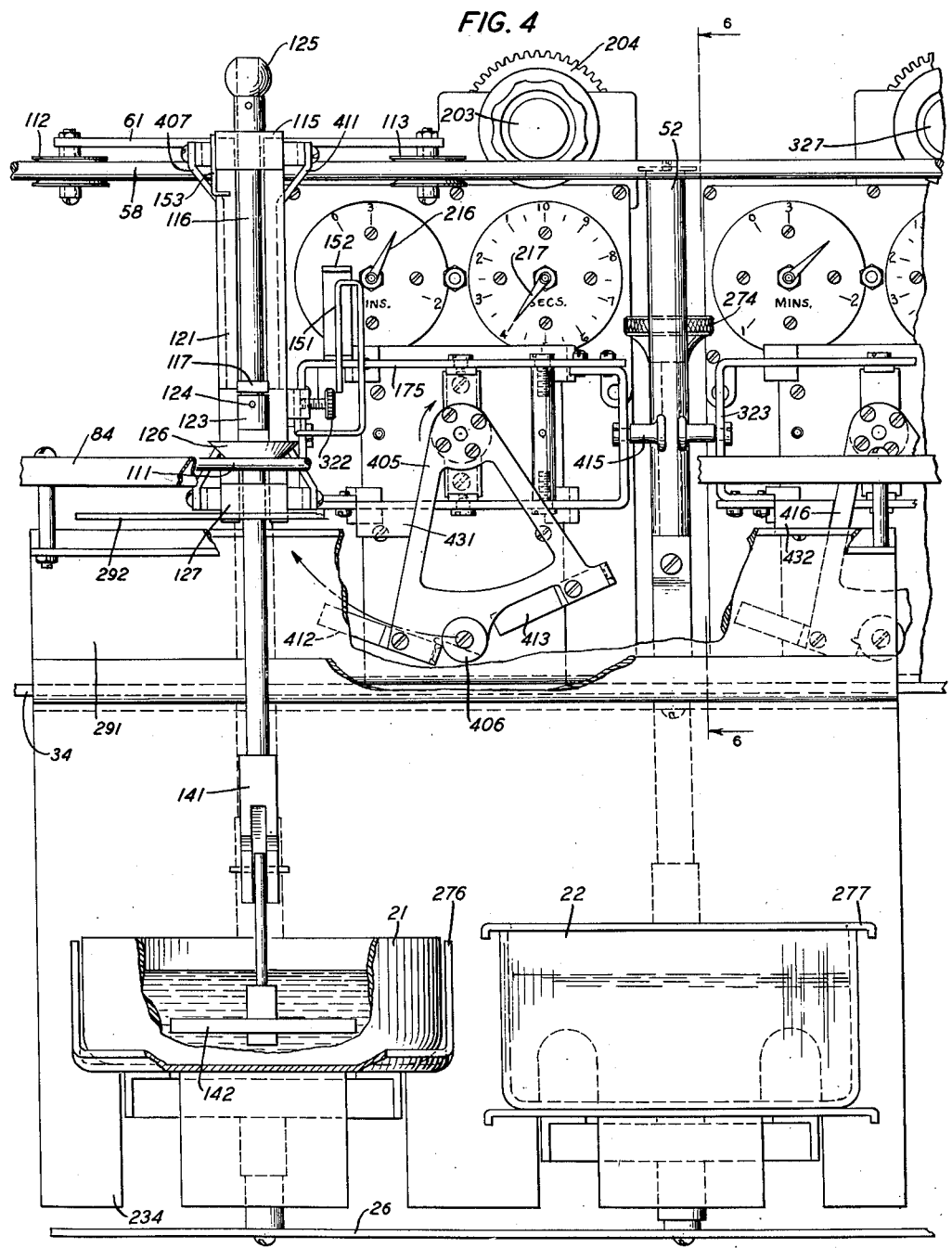

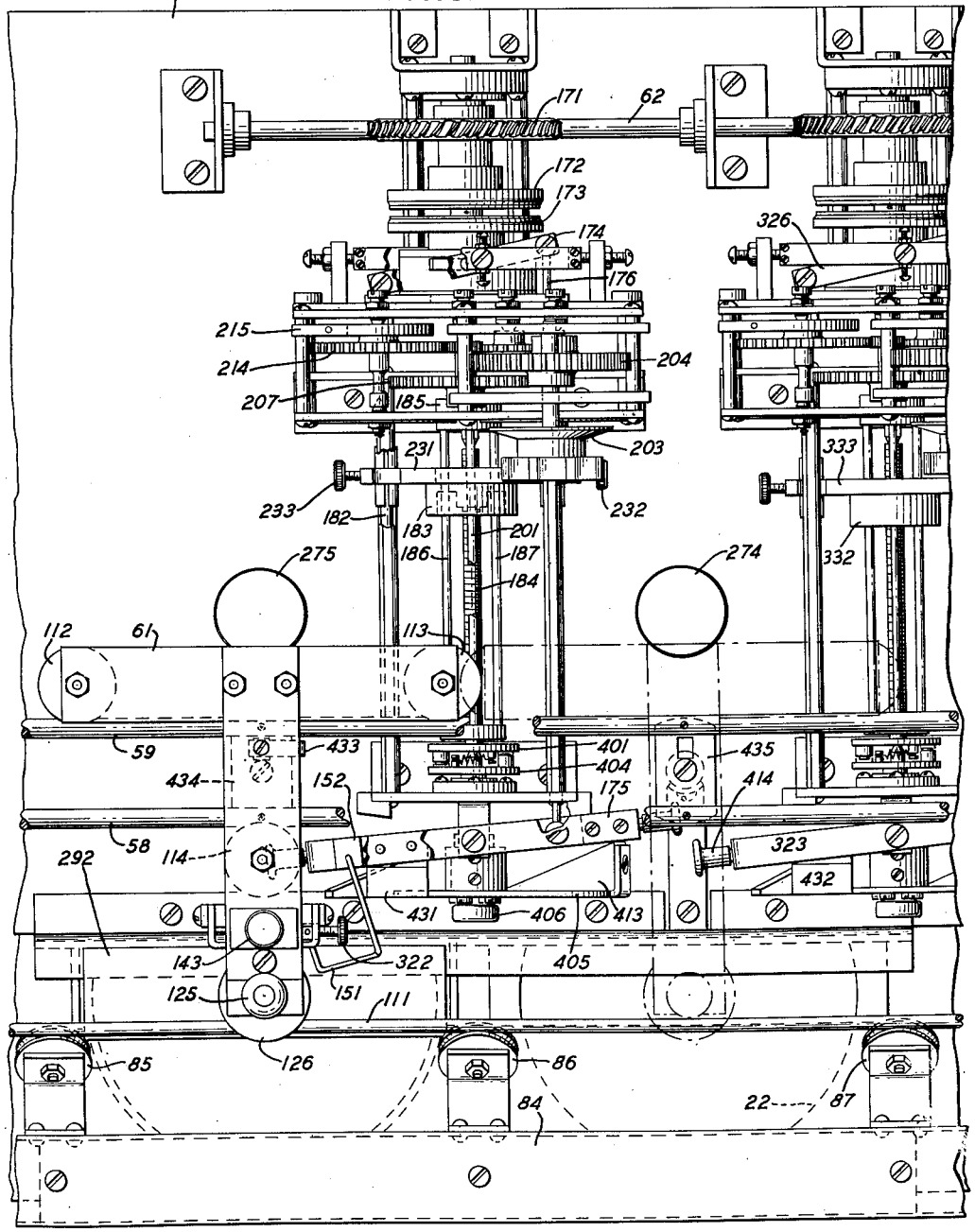

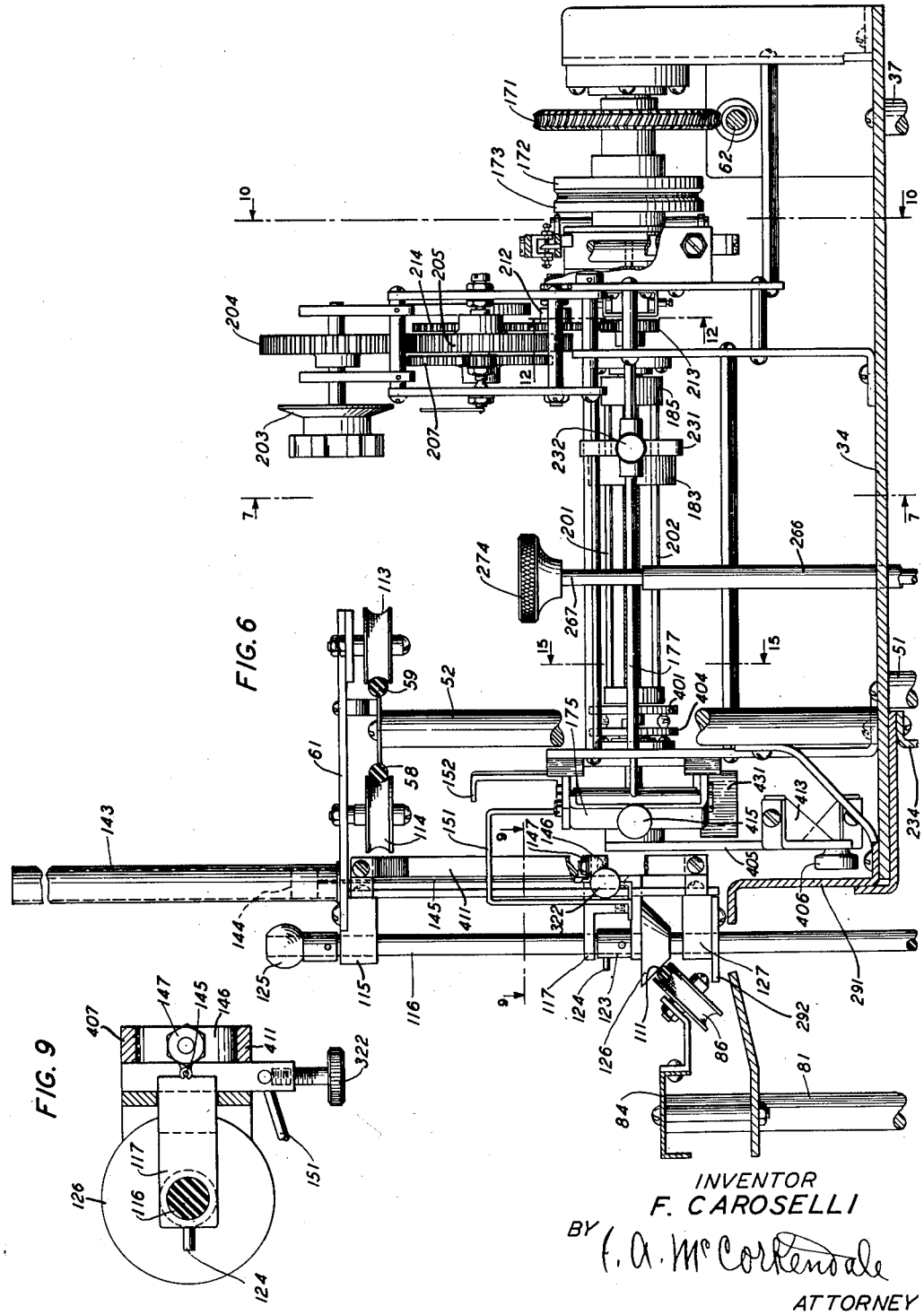

Dec. 19, 1950　　　F. CAROSELLI　　　2,534,338
AUTOMATIC ETCHING APPARATUS
Filed Nov. 20, 1948　　　10 Sheets-Sheet 7
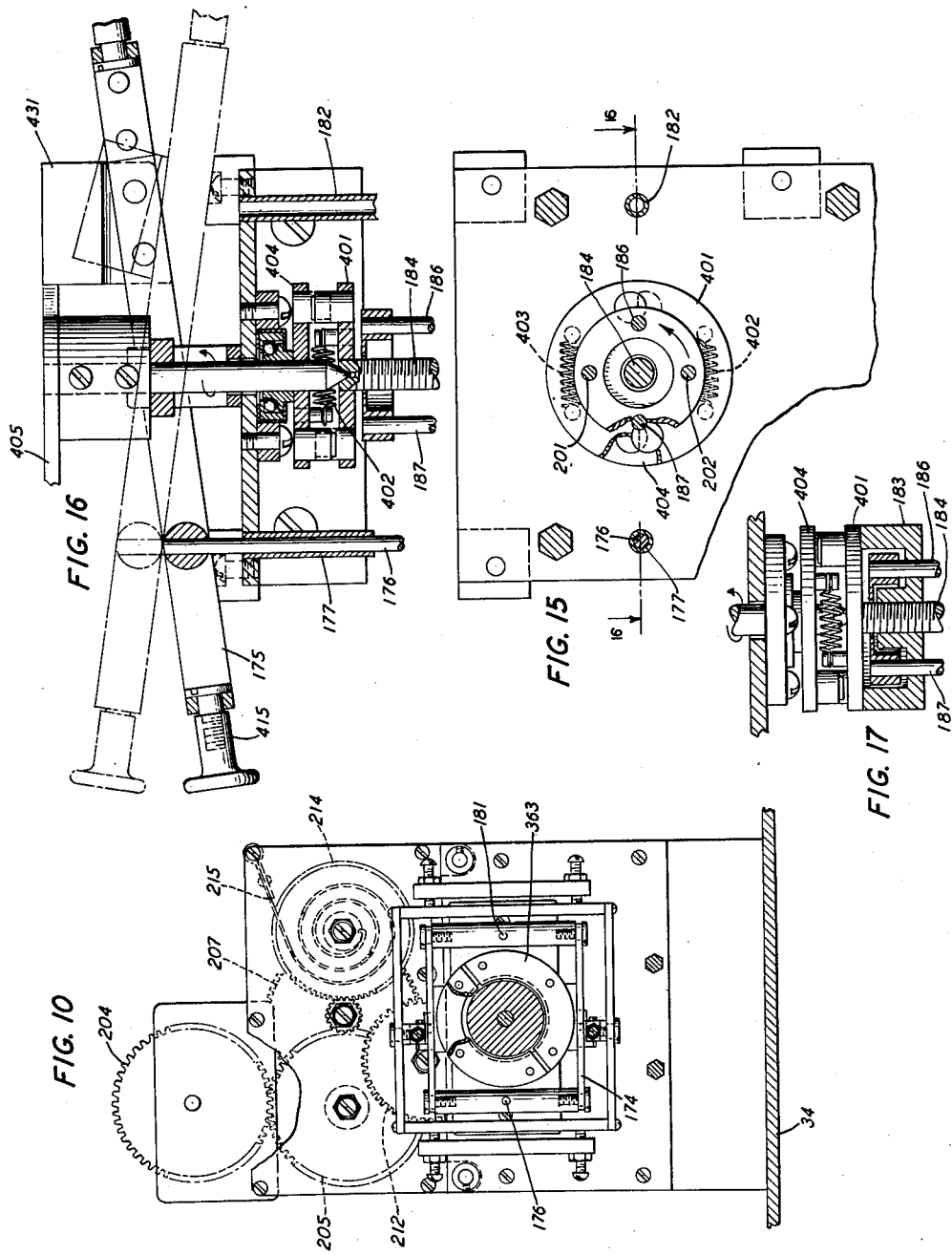
INVENTOR
F. CAROSELLI
BY
[signature]
ATTORNEY Dec. 19, 1950  F. CAROSELLI  2,534,338
AUTOMATIC ETCHING APPARATUS
Filed Nov. 20, 1948  10 Sheets-Sheet 8

INVENTOR
F. CAROSELLI
BY
ATTORNEY

Dec. 19, 1950 F. CAROSELLI 2,534,338
AUTOMATIC ETCHING APPARATUS
Filed Nov. 20, 1948 10 Sheets-Sheet 9
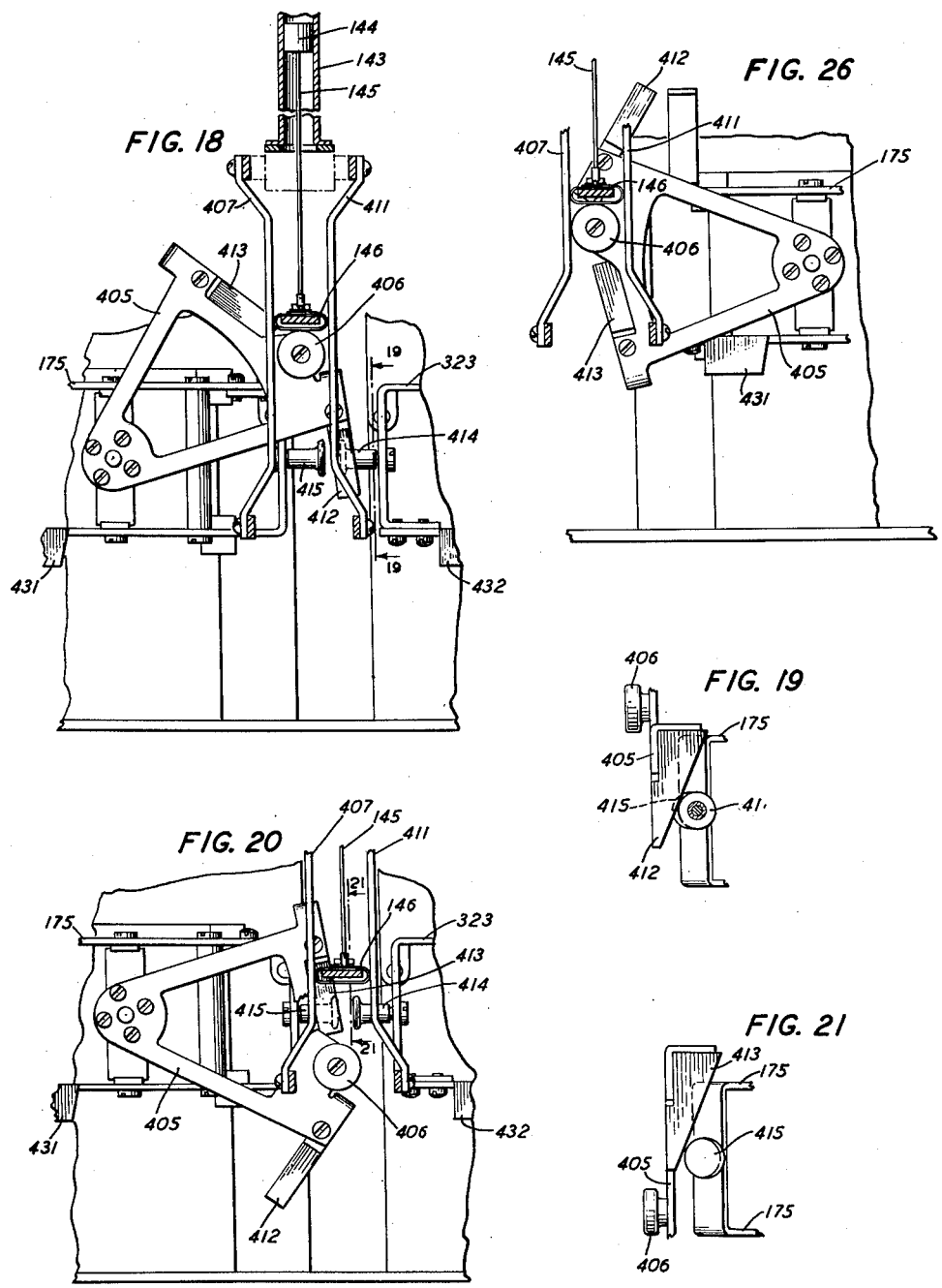
INVENTOR
F. CAROSELLI
BY
ATTORNEY Dec. 19, 1950 F. CAROSELLI 2,534,338
AUTOMATIC ETCHING APPARATUS
Filed Nov. 20, 1948 10 Sheets-Sheet 10
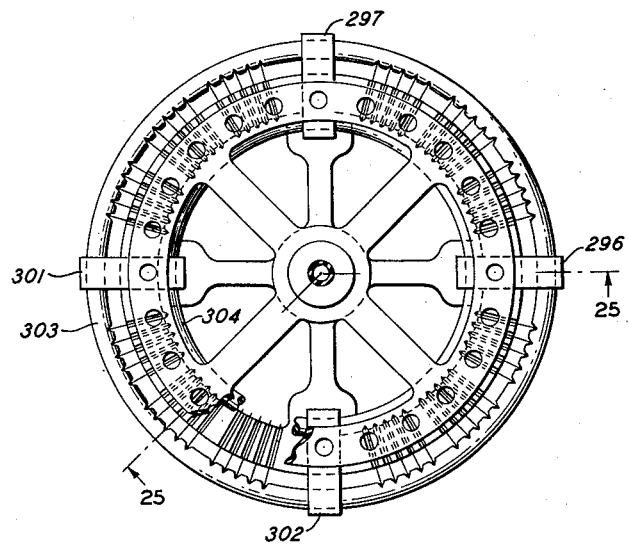
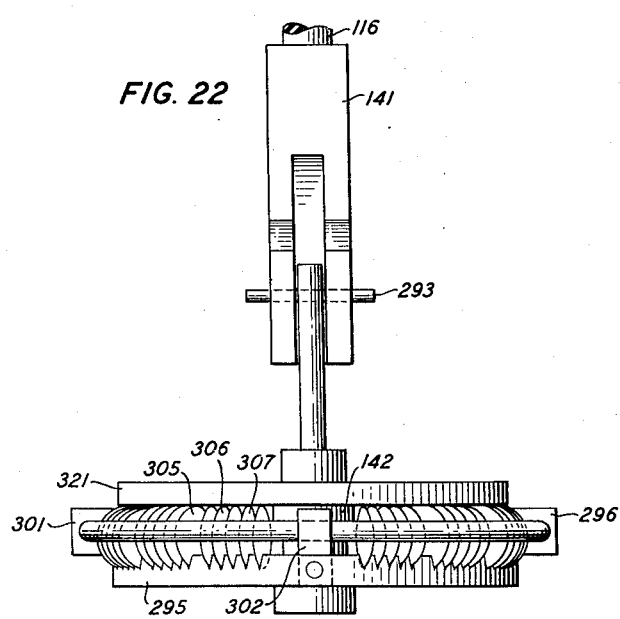
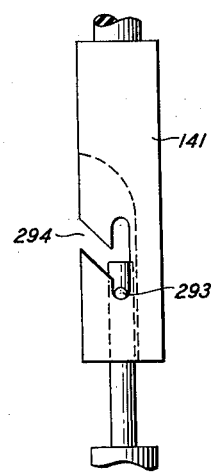
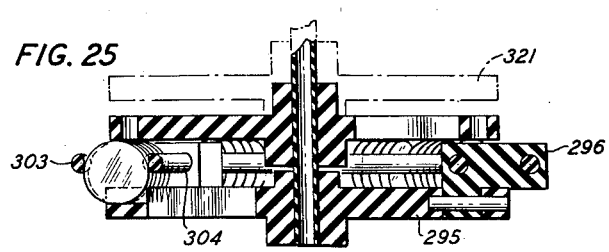
INVENTOR
F. CAROSELLI
BY
ATTORNEY Patented Dec. 19, 1950

2,534,338

UNITED STATES PATENT OFFICE 2,534,338

AUTOMATIC ETCHING APPARATUS

Frank Caroselli, Maplewood, N. J., assignor to Bell Telephone Laboratories, Incorporated, New York, N. Y., a corporation of New York Application November 20, 1948, Serial No. 61,239

8 Claims. (Cl. 41—9)

This invention relates to etching apparatus and more particularly to automatic etching apparatus which includes a plurality of treatment positions for the specimen being etched.

An object of the invention is to facilitate the etching of specimen by the multiple treatment position method and to improve the resulting product.

A more specific object of the invention is to achieve automatic and independently adjustable control of the movement of a specimen from one treatment position or stage to the next.

The invention is particularly applicable in connection with the automatic etching to frequency of quartz piezoelectric crystal plates and will be described as so applied. It will be apparent, however, that the arrangement is applicable as well in connection with the etching of other objects.

In the production of quartz piezoelectric crystal plates it is now more or less common practice to obtain the final, minute adjustment of thickness, with the corresponding exact change in resonant frequency, by the etching process. In this process it is usual to subject the specimen to a series of "treatments." For example, the specimen may first be immersed in a first etching bath, of a suitable acid composition and left therein for a predetermined time interval. At the end of the time interval the specimen may be removed from the first etching bath and transferred to a second bath which, this time, may be a cleansing bath, for example, distilled water. After remaining in the cleansing bath for a predetermined interval, the specimen may be transferred to a third bath which may be, for example, a second etching solution or another cleansing bath. This treatment may continue over several positions or stages and it must be kept in mind that the time intervals of each treatment may, and often do, vary respectively with respect to each other, and, further, may be different for different types of specimen and for different treatments of the same types of specimen. It is obvious, therefore, that when the operations are controlled manually, for example, with the aid of a stop watch, the task is a particularly painstaking one, the procedure is expensive and the results are often quite erratic.

In accordance with a particular feature of the present invention, the entire travel of a specimen from the first stage or position of treatment to the final stage is automatically controlled and, once started, is entirely free of manual control or supervision.

In accordance with a further feature of the invention the time interval of each treatment position or stage is independently adjustable.

In accordance with a specific embodiment of the invention, a carriage upon which a plurality of specimens to be treated is supported, is progressively moved from one stage to the next along an overhead track the carriage being stopped when each new position is reached and the specimen-supporting tray then being lowered to immerse the objects in the respective tank. Motion is transmitted from a main drive shaft to the transfer mechanisms by means of clutches; a timing device is associated with each clutch whereby the operation of each transfer mechanism is independently adjustable so far as effective time intervals are concerned.

A complete understanding of the arrangement contemplated by the present invention and of the method of operation thereof may be had by consideration of the following detailed description and the attached drawings in which:

Fig. 4 is a partial front elevation view showing the crystal carrying tray immersed in a bath tank;

Fig. 5 is a plan view of the portion of the mechanism shown in Fig. 4, with the toggles shown in normal or rest position;

Fig. 6 is a sectional view taken on line 6—6 of Fig. 4;

Fig. 9 is a sectional view taken on line 9—9 of Fig. 6;

Fig. 10 is a sectional view taken on line 10—10 of Fig. 6 and shows particularly the clutch adjusting mechanism;

Fig. 15 is a sectional view taken on line 15—15 of Fig. 6;

Fig. 16 is a sectional view taken on line 16—16 of Fig. 15 showing particularly the spring coupling to the crank arm;

Fig. 17 is a fragmentary view similar to a portion of Fig. 16 but showing the timing flywheel in contact with the elastic shock plate;

Fig. 18 is a fragmentary front elevation showing a camming element of the crank arm in contact with a toggle knob to start the associated transfer mechanism;

Fig. 19 is a sectional view taken on line 19—19 of Fig. 18;

Fig. 20 is a fragmentary front elevation showing a second camming element of the crank arm in contact with a toggle knob to stop the associated transfer mechanism;

Fig. 21 is a sectional view taken on line 21—21 of Fig. 20;

Fig. 22 is a front elevation view of the specimen holding tray;

Fig. 23 is a plan view of the tray of Fig. 22;

Fig. 24 is a side elevation showing the suspension coupling between the tray and lift rod;

Fig. 25 is a sectional view taken on line 25—25 of Fig. 23; and

Fig. 26 is a view similar to Fig. 18 but showing the crank wheel at the start of the motion for lifting the crystal carrying tray out of the bath tank.

Figure 1:
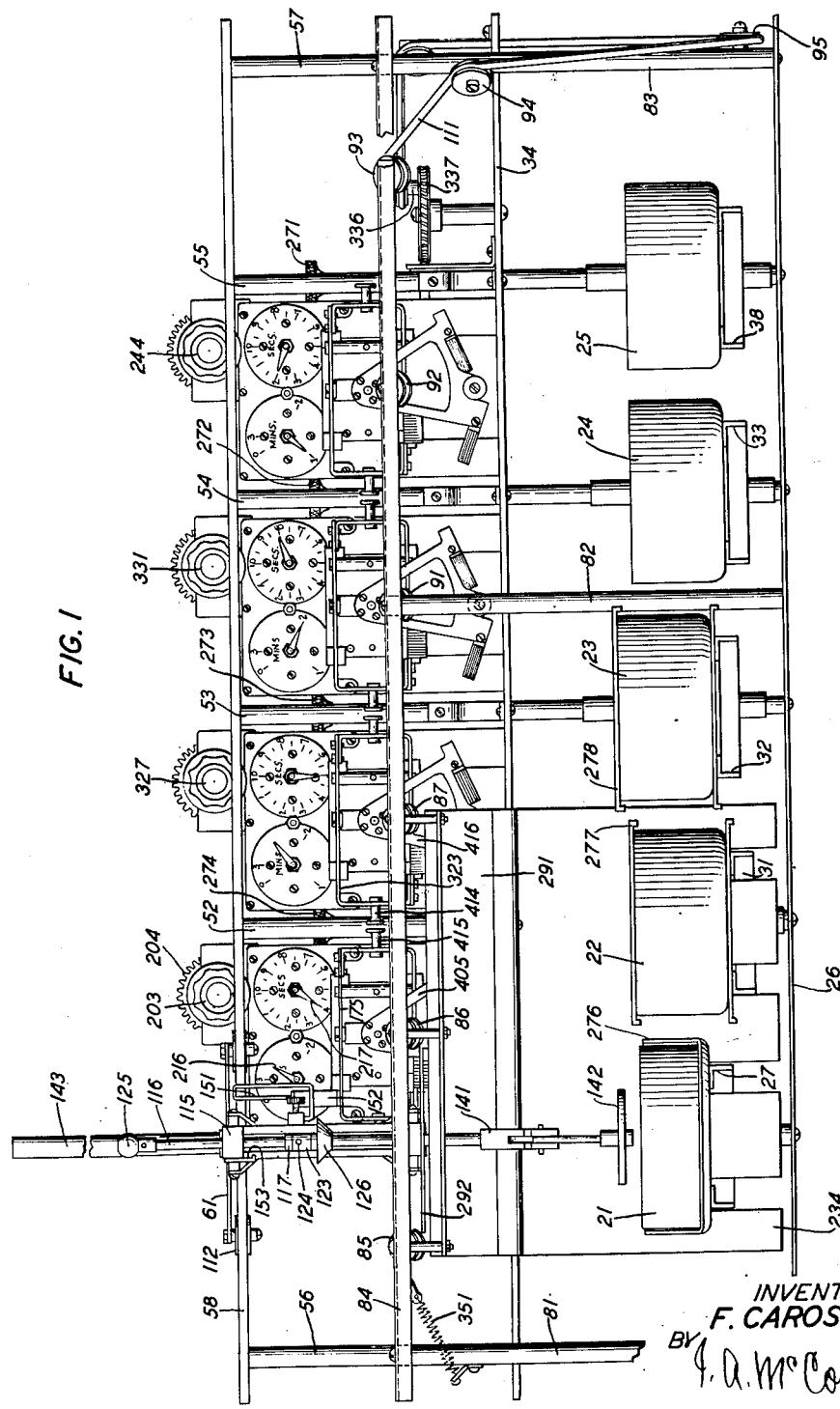
Fig. 1 is a front elevation view of an automatic etching machine which embodies features of the present invention.
Figure 2:
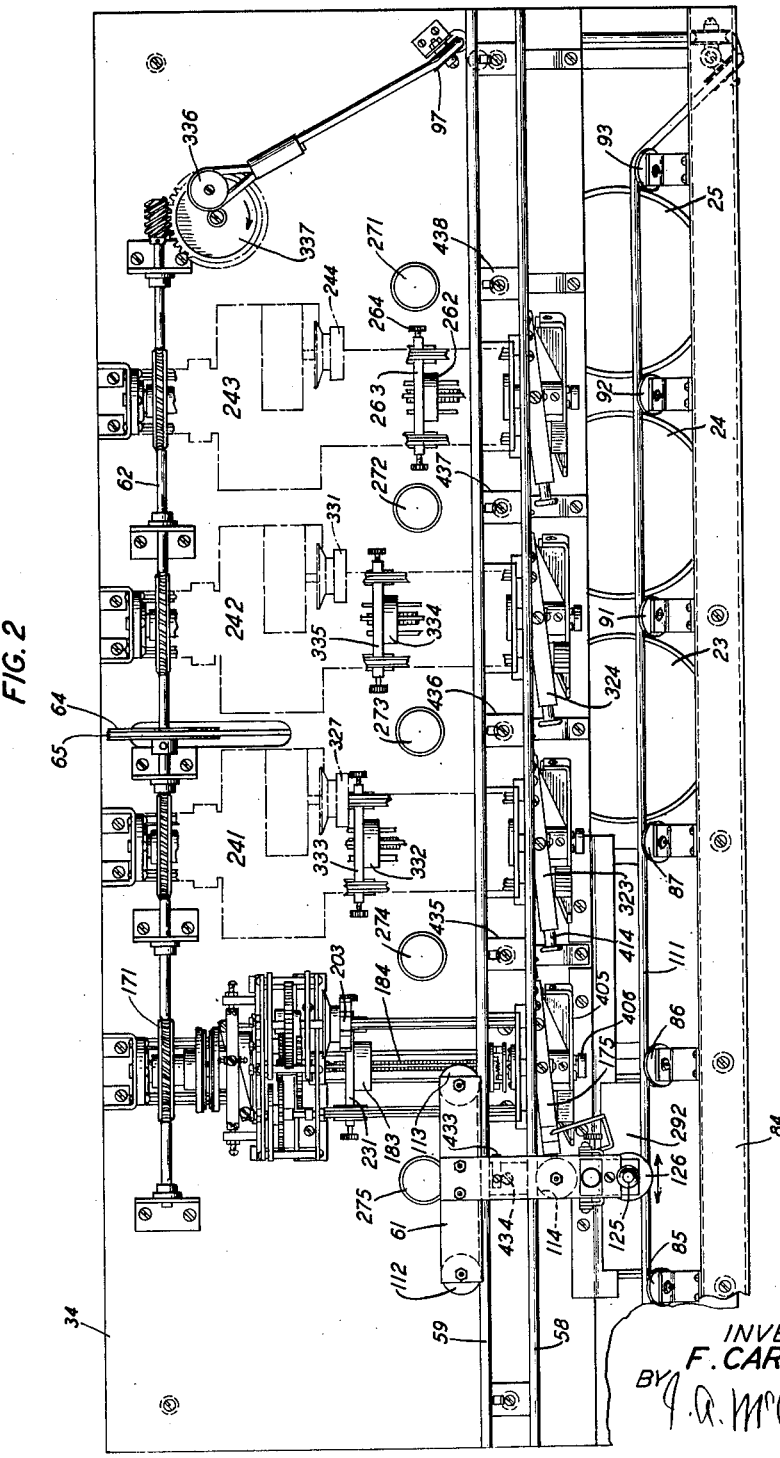
Fig. 2 is a plan view of the machine illustrated in Fig. 1, the details of the first transfer mechanism being shown completely and those of the other transfer mechanisms, which are substantial duplicates of the first, being indicated in outline to avoid complications of the drawing.

Referring now to the drawings and first to Figs. 1 and 2 there is illustrated an automatic etching machine which embodies features of the present invention. In the particular embodiment of the machine illustrated, five treatment stages or positions are provided as represented by the five treatment tanks or troughs 21, 22, 23, 24 and 25. Each tank is supported a short distance above the main base 26 of the machine by an adjustable platform, tank 21 being supported by platform 27, tank 22 by platform 31, tank 23 by platform 32, tank 24 by platform 33, and tank 25 by platform 38. The position of each platform may be adjusted vertically in a manner that will be described subsequently.

Figure 3:
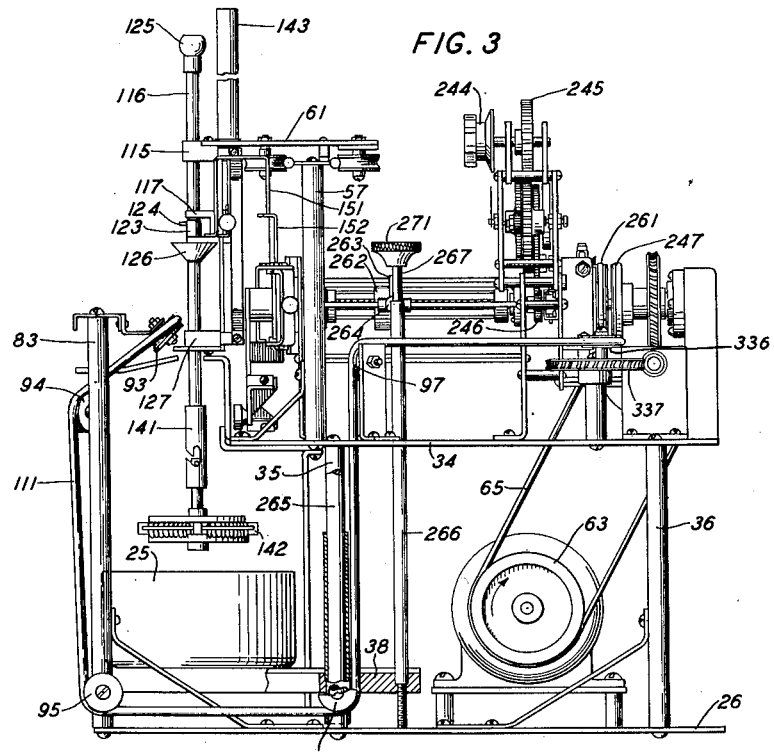
Fig. 3 is a side elevation view of the machine.

Subbase 34 (Figs. 1, 3, 6) is supported above main base 26 by a number of suitable vertical posts, two of these posts, 35 and 36, being shown in Fig. 3 and two, 37 and 51, being shown in part in Fig. 6. Other posts, in turn, extend upwardly from subbase 34, as posts 52, 53, 54, 55, 56 and 57 (Fig. 1), and support trolley rods 58 and 59 (Fig. 2) along which specimen tray carrier or carrier 61 travels. The four individual transfer mechanisms, which will be described in detail subsequently, are mounted on subbase 34 by suitable brackets and angle pieces; each of these transfer mechanisms has associated therewith an individual clutch and timing means. The transfer mechanisms are all driven by a common drive shaft 62 (Fig. 2) which, in turn, is driven by motor 63 (Fig. 3) the drive wheel of which is coupled to pulley 64 of shaft 62 by belt 65.

Also supported from main base 26 by means of upright posts 81, 82 and 83 (Fig. 1) is roller supporting bar 84. Bar 84 acts as a supporting means for guide rollers 85, 86, 87, 91, 92 and 93 which, together with similar rollers 94 and 95 mounted on posts 83 and rollers 96 and 97 (Fig. 3) act as guides for agitator belt 111 which functions in a manner to be described subsequently to rotate or agitate the elements during their immersion in the respective treatment tanks.

The specimen tray carrier or carriage, i. e., the mechanism supporting and transferring the specimen from one treatment position to the next, includes a T-shaped trolley or carriage 61 provided with three trolley wheels, two of which, 112 and 113, travel along trolley rod 59 and the other of which, 114, travels along trolley rod 58. Mounting block 115 (Fig. 3) is supported by carriage 61 and tray lift rod 116 is positioned for vertical movement in an aperture provided in block 115. Lift block 117 is mounted on lift rod 116, a portion of the lift block being slidably positioned in the guideway between vertical guide members 121 and 122 (Fig. 4) which project downwardly from carriage 61. A collar 123 is positioned on lift rod 116 between portions of lift block 117 and a holding pin 124 is positioned in the collar. A suitable knob 125 is provided on the upper end of lift rod 116 to facilitate manual operation thereof.

A wheel 126 in the shape of an inverted, truncated cone is rigidly mounted on lift rod 116 and acts in conjunction with agitator belt 111, when the lift rod is in lowered position, to bring about agitation of the specimen in a manner that will be described in detail subsequently.

Lift rod 116 extends downwardly through a second apertured positioning block 127 and terminates in hooked portion 141. Specimen tray 142, which will be described in detail subsequently, is supported from the end of lift rod 116; the specific attachment means will also be described in detail subsequently.

Hollow, cylindrical dash-pot tube 143 is mounted upon and extends upwardly from carriage 61 (Fig. 6). A snugly fitting piston 144 (Figs. 6 and 18) is positioned within tube 143 and is connected by means of rod 145 to spring member 146 which is, in turn, connected to lift block 117 by nut 147 (Figs. 6 and 9). This device operates, in accordance with well understood principles as a damping means for the downward movement of lift rod 116 and tray 142 supported thereby.

Angle arm 151 is attached to lift block 117; on occasion, as in the position of the machine shown in Fig. 3, the free end of this arm is engaged with start arm 152 whereby to hold the lift rod assembly in a partially raised position with the tray held a short distance above the immersion point. On other occasions, for example when the tray is being loaded, the lift arm may be held in extreme raised position by rotating the rod, after it has been raised, to position pin 124 in bracket 153 (Figs. 1 and 4); bracket 153 is attached to block 115.

In the particular embodiment of the invention illustrated in the drawings, wherein five different treatment positions or stages are provided, four sets of transfer control mechanisms are provided. The first set controls the time of treatment at the first stage and, upon completion thereof, transfers the specimen tray to the second stage; the second set controls the time of treatment at the second stage and subsequent movement of the tray to the third stage and so on with the fourth set controlling the time of treatment at the fourth stage and subsequent movement to the fifth or final stage. It is contemplated that removal of the specimen tray from the final stage will be done manually.

As all four sets of transfer control mechanisms are generally the same, only one set will be described in detail. Each set of control means includes, in general, adjustable time controlling means, clutch means, control toggles and a transfer crank arm.

Figure 8:
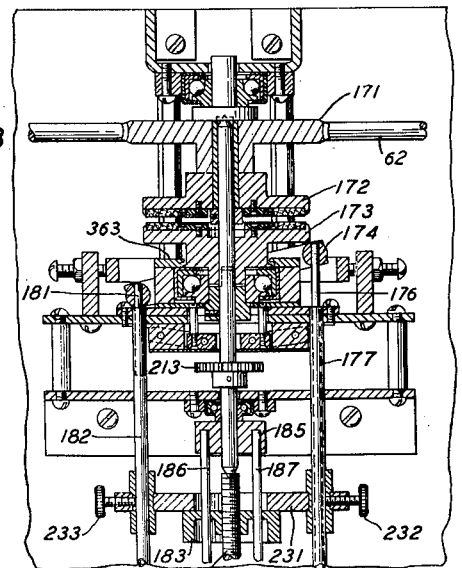
Fig. 8 is a sectional view taken on line 8—8 of Fig. 7, the clutch plates being disengaged.
Figure 14:
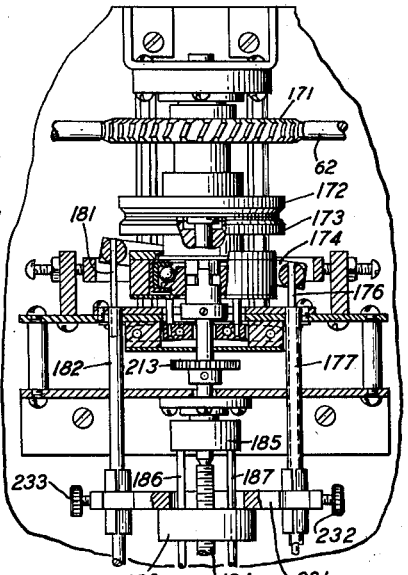
Fig. 14 is a sectional view similar to Fig. 8 except that the rear toggle is shown in operate position and the clutch faces are engaged.

Worm wheel drive 171 (Figs. 5 and 6) is driven at a constant rate by drive shaft 62 causing corresponding rotation of clutch drive plate 172 which is directly coupled to the worm wheel. Clutch follower plate 173 is moved from a position wherein it is disengaged with respect to drive plate 172 (Fig. 5) to a position wherein it is engaged with the drive plate (Fig. 6) under control of rear toggle 174 and mechanism associated therewith which will be described in detail subsequently. Rear toggle 174 is mechanically coupled to front toggle 175 (Fig. 5) by rod 176 which is positioned in protective tube 177 (Fig. 8). Through this coupling any movement of front toggle 175 causes a similar movement of rear toggle 174. In order to balance the structure and improve the rigidity thereof, a short balancing rod 181 and enclosing tube 182 (Figs. 8 and 14) are provided opposed in position with respect to rod 176 and tube 177; these two elements, i. e. rod 181 and tube 182, do not serve as active coupling means between the two toggles however.

Timing flywheel 183 is rotatably positioned on timing screw 184 (Figs. 5, 8 and 14) and, when the clutch is engaged and clutch drive plate 173 and associated members including block 185 are rotating, said flywheel is rotated on screw 184 by drive rods 186, 187, 201 and 202. As flywheel 183 is rotated on timing screw 184 (the screw remaining stationary), it moves forward along the screw (to the left in Fig. 6) and, upon reaching the forward end of the screw, will set into operation certain other mechanisms (to be described in detail subsequently) which control the transfer of the specimen carrying tray from one treatment stage to the next. Timing of the treatment at each stage, therefore, is determined by the position that each timing flywheel normally occupies on the associated timing screw, i. e., the position occupied by the flywheel at the time the associated clutch is engaged.

Figure 7:
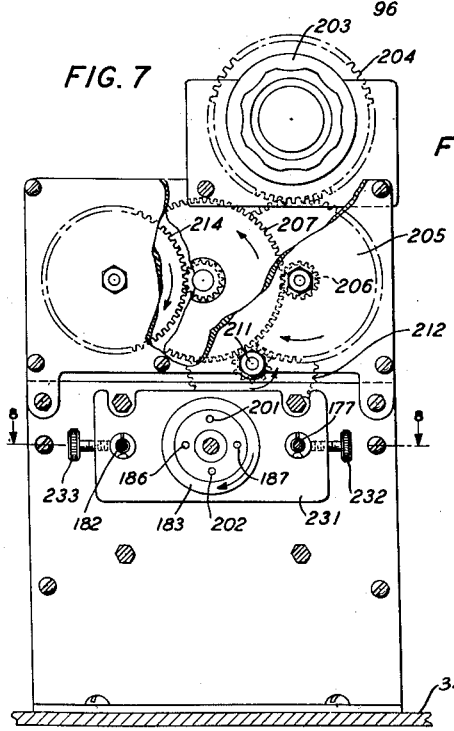
Fig. 7 is a sectional view taken on line 7—7 of Fig. 6 showing particularly the arrangement of the timing gears.

The position of the flywheel 183 on timing screw 184 may be adjusted (when clutch plates 172 and 173 are disengaged) by operation of adjusting dial 203. Rotation of dial 203 causes corresponding rotation of gear 204 (Fig. 7) to which it is directly coupled; this motion is in turn transmitted through gears 205, 206, 207, 211 and 212 to gear 213 (shown in Fig. 8) and also to gear 214. Rotation of gear 213 causes corresponding rotation of block 185 with resultant rotation of flywheel 183 and adjustment thereof on screw 184. Rotation of gear 214 causes spring 215 (Fig. 10) to be "wound-up," i. e., to store up energy.

Rotation of dial 203 also results in rotation of pointers 216 and 217 upon the "Minutes" and "Seconds" scales, respectively, thereby furnishing a convenient indication of the time interval selected by the adjustment of the timer flywheel on the screw.

After flywheel 183 has been moved to the desired position on timer screw 184, stop plate 231 is moved up into snug contact with the rear face of the flywheel (as shown in Fig. 8) and locked in position by tightening thumb-screws 232 and 233 down against tubes 177 and 182; these tubes in addition to serving as protectors and guides for rods 176 and 181 as set forth above serve also as supporting and guiding tracks for stop plate 231.

All of the transfer mechanisms are in general alike and the other three sets, 241, 242 and 243 (Fig. 2) will not be described in detail and, in order to avoid complication of the drawings have not been shown in detail in Fig. 2. However, in Fig. 3 (end elevation) parts of set 243 are shown for comparison, for example, dial 244; gear 245 (corresponding to gear 204); gear 246 (corresponding to gear 213); clutch drive plate 247; clutch follower plate 261; timer flywheel 262; stop plate 263; and stop plate locking bolt 264.

It is believed that further description of the machine can well be in the form of a detailed description of the operation thereof, additional detailed description of parts involved being inserted when desirable. It will be assumed that the machine illustrated in the drawing and described in part above is to be used for the automatic etching to frequency of quartz crystal plates. Assuming that this treatment is to comprise immersion for a predetermined period of time in an acid etching solution followed by successive rinses in four different cleansing baths, tank 21 (Fig. 1) will be filled to a convenient level with a suitable etching solution while tanks 22, 23, 24 and 25 will be filled with suitable cleansing liquid, for example, distilled water.

The level of each tank, i. e., its vertical position with respect to base 26 may be readily adjusted, within limits, in order to attain the proper working level in relationship to the specimen tray 142. The adjusting means is generally the same for each of the five tanks and that provided for tank 25 will be described as typical of all; this adjustment means is shown most clearly in Fig. 3. As previously set forth above, each of the treatment tanks is adjustably supported above base 26 by a platform; tank 25 is supported by platform 38.

Platform 38 is slidably (vertically) supported on upright rod 265 and tube 266 (Fig. 3) and its vertical position is determined by rotation of rod 267, hand-grid 271 being provided to facilitate this operation. The lower end of rod 267 is threaded and these threads engage similar threads provided in the aperture in platform 38. As the platform is held against rotation, rotation of rod 267 will result in vertical movement of the platform either up or down depending upon the direction of rotation hand-grip 271 is turned.

The vertical positions of the respective tanks 21, 22, 23, 24 and 25 are fixed at the desired levels by adjustment of respective hand-grips 275, 274, 273, 272 and 271 (Fig. 2).

A shield 234 (Figs. 1 and 4) is provided adjacent to the first two treatment positions in order to protect machine and personnel against possible splashes of acid while tank 21 is preferably constructed of an acid-resistant material such as lead and is supported in an auxiliary holder 276, similarly of acid-resistant material. Tanks 22 and 23 are provided with protective collars 277 and 278, respectively, for protecting against dripping acid.

The operating mechanism is afforded further protection against acid splashes by shield 291 (Fig. 1) which is stationary and by shield 292 (Fig. 2) which travels along with carriage 61.

The specimen tray 142 is now filled or "loaded" with the objects to be etched and it will be assumed for purposes of the present description that the objects are quartz, piezo-electric plates circular in shape. Tray 142 is commonly removed from the assembly for more convenient loading and, as shown most clearly in Fig. 24, this is readily accomplished simply by raising the tray until pin 293 registers with angular slot 294 provided in hook portion 141. The arrangement is such as to permit ready removal and replacement of the tray and yet to provide a firm coupling when the tray is in attached position.

As shown most clearly in Figs. 22, 23 and 25, tray 142 is designed to permit ready "loading" with the crystal plates and to so individually support each plate that both sides thereof are exposed to the treatment of liquid. Tray 142 includes a base 295 from which is supported, through the medium of four blocks 296; 297; 301 and 302, two concentric rings 303 and 304 of suitable material such as hard rubber. The opposed surfaces of rings 303 and 304 and the upper surface of base plate 295 are all provided with a series of corresponding slots; the resulting sets of slots serve as nests for receiving the edges of the respective crystal plates to be treated, as plates 305; 306; 307. As an aid to holding the plates in position, top plate 321 is provided which rests lightly against the upper edges of the crystal plates. As indicated in Fig. 25, top plate 321 may be raised on the shaft when desired to facilitate loading or unloading the tray.

After tray 142 has been loaded with the quartz plates to be treated, it is recoupled to lift rod 116 and the assembly is raised through manual manipulation of knob 125 to the position illustrated in Figs. 1, 2, 3 and 5 wherein the free end of angle arm 151 engages the free end of start arm 152. Engagement of these two members is effective to support the assembly in a semi-raised position wherein, as best shown in Fig. 1, loaded tray 142 is suspended a short distance above the first treatment tank 21. When desirable, slight adjustment may be made in the angular position of angle arm 151 after loosening up on clamping thumb screw 322.

It should be pointed out that at this point all four sets of transfer mechanisms are in normal position; that is, for example, the respective clutch drive plates and clutch follower plate are disengaged so that, even though the respective spur gears (as gear 171) and the clutch drive plates directly coupled thereto (as plate 172) are being rotated by drive shaft 62 (it being assumed that motor 63 is in operation), the respective timing flywheels (as 183) are not rotating. All four front toggles, i. e., 175; 323; 324 and 325 (Fig. 2) are in normal "toed-out" position i. e., considering the left-hand ends of the toggles as seen from the front of the machine as the "toes," while the respective rear toggles 174; 326 (Fig. 5) and the other two similar toggles which are not illustrated in detail are in their corresponding normal or "toed-in" position.

Having determined now the duration of the treatment at each of the stages, i. e., the time tray 142 is to be immersed in each of the first four tanks 21; 22; 23; and 24 (it is contemplated that the tray will be removed from the last tank 25 through manual control), the respective timer flywheels of the four transfer mechanisms are adjusted accordingly on the associated timer screws through operation of dials 203; 327; 331 and 244 (Fig. 1). As set forth above, manipulation of these dials is effective to move the associated timer flywheel along the timer screw until the desired adjustment dictated by the selected time interval has been reached; this is shown by the positions of the pointers on the associated "minutes" and "seconds" scales. As set forth above, once the desired position of a flywheel has been attained, a stop plate is brought into position against the rear of the flywheel and locked in that position whereby to establish a normal return position for the flywheel.

Ordinarily the time interval selected for each treatment stage will be different and the flywheels will be set at varying points on the associated timer screws. One possible arrangement is indicated in Fig. 2 where the respective flywheels 183; 332; 334 and 262 and associated back plates 231; 333; 335 and 263 are all shown in respectively different positions on the timer screws.

The desired time interval adjustments of each of the four transfer mechanisms having been established and tray 142 being loaded with crystal plates for treatment, actual operation of the treatments may be started. It will be recalled that lift rod 116 is held in partially raised position through engagement of angle arm 151 and start arm 152.

Figure 11:
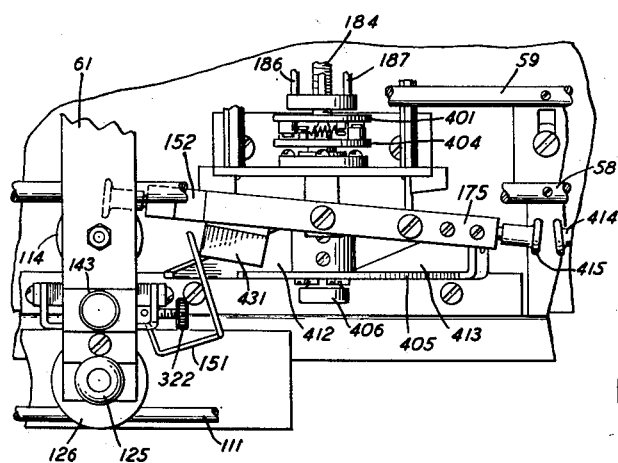
Fig. 11 is a fragmentary view of a portion of the mechanism illustrated in Fig. 5, the front toggle being shown in operate position.

In order to start the automatically controlled, timed operations of the machine, front toggle 175 is manually pushed to its "operate" or "toed-in" position which is illustrated in Figs. 6, 4 and 11. (Due to its action this position of the toggle will be referred to also as "spring activating" position.) This movement of toggle 175 moves start arm 152 out of its previous supporting contact with angle arm 151 and the lift arm assembly including tray 142 is allowed to drop whereby to immerse tray 142 and the crystal plates carried thereby, as plates 305; 306; 307 (Fig. 22) in the etching solution carried by tank 21 of the first treatment position. The falling action of the tray is dampened by the action of piston 144 in dash-pot tube 143 which has been discussed above.

As shown most clearly in Figs. 4 and 6, when tray 142 is in lowered or immersed position, conical wheel 126 carried by lift rod 116 is in engagement with agitator belt 111. One end of belt 111 is attached to cam 336 rotated by spur gear 337 which, in turn, is coupled to drive shaft 62 (Fig. 2) while the other end of the belt is resiliently attached, through coil spring 351 (Fig. 1), to post 81. As gear 337 rotates, therefore, we have a constant to-and-fro motion of belt 111 and this motion, through engagement of wheel 126 with the belt, is transferred to tray 142. This oscillating motion of the tray while immersed is effective to "agitate" the specimen in the solution and to further the treatment.

Figure 13:
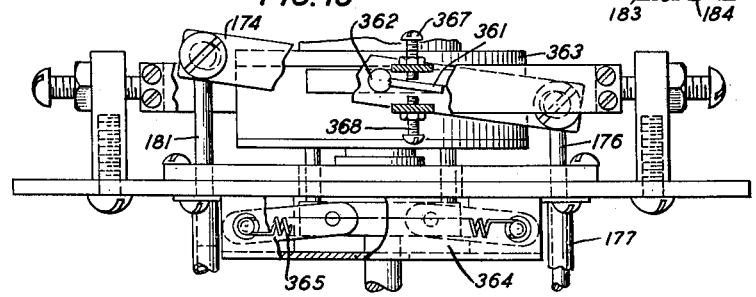
Fig. 13 is a plan view of the portion of the machine shown in Fig. 12.
Figure 12:
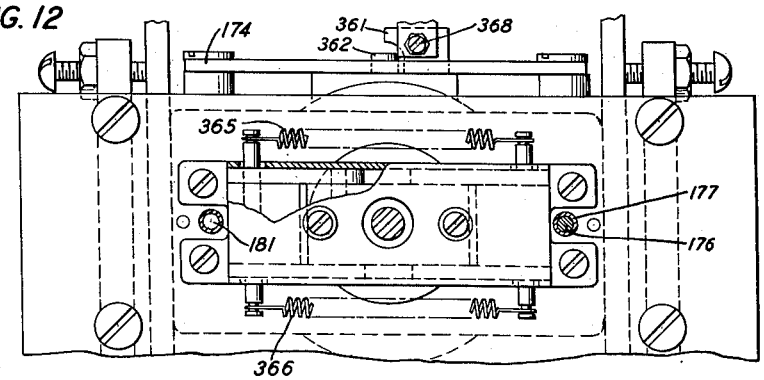
Fig. 12 is a sectional view taken on line 12—12 of Fig. 6 and shows particularly the clutch operating mechanism.

As front toggle 175 is moved to its "toed-in" position, rear toggle 174 is moved to its corresponding "toed-out" or operate position (Fig. 14) due to the direct mechanical coupling of the two toggles by rod 176 referred to above. As toggle 174 moves in this direction, lever contact plate 361 (Fig. 13) causes a pivoting action which transmits the motion of the toggle to pin 362 which is attached to housing 363. The resulting longitudinal motion of housing 363 causes toggle block 364 to move through dead center and springs 365 and 366 are activated and then supply the actual force to snap the clutch closed, i. e., to move clutch follower plate 173 into engagement with clutch drive plate 172. The operation of the mechanism may be adjusted by adjusting screws 367 and 368, the respective projections of which limit the motion of the toggle before motion is transmitted to pin 362 by plate 361.

As clutch follower plate 173 is brought into engagement with clutch drive plate 172, it is rotated thereby and this rotary motion is transmitted to timer flywheel 183 by drive rods 186, 187, 201 and 202. As flywheel 183 is rotated, it moves laterally along timer screw 184 at a rate which is determined by the speed at which the flywheel is being rotated and by the pitch of the thread provided on timer screw 184. As the flywheel nears the front end of timer screw 184 the leading face surface contacts crank plate 401 as shown most clearly in Fig. 17. Continued rotation of flywheel 183 then causes corresponding rotation of crank plate 401; this motion is transmitted through springs 402 and 403 to follower crank plate 404. Follower crank plate 404 is directly coupled, as seen in Fig. 17, through stub shaft 450 and crank block 451 to crank arm 405, which is therefore caused to rotate.

As crank arm 405 is now rotated in a clockwise direction (as indicated by the arrows in Fig. 4) crank wheel 406 carried thereby is caused to enter the ways 407 and 411 of the lift rod assembly and to raise the lift rod assembly through contact between wheel 406 and spring member 146 carried by rod 145 (shown particularly in Fig. 26). This, of course, means that tray 142 is lifted up out of tank 21. Now as rotation of crank arm 405 continues, the vertical lifting motion exerted by crank wheel 406 is changed gradually to a horizontal pushing motion which is effective to move carriage 61 (and the entire lift rod assembly supported thereby) along the trolley rods 58 and 59 toward the second treatment position.

In addition to crank wheel 406, two other important elements are carried by crank arm 405, namely cams 412 and 413. The mechanism is so designed that, just short of the time when carriage 61 reaches the second treatment position (this position is indicated by dotted lines in Fig. 5) and as crank arm 405 is just completing its rotation, the first cam 412 engages operating knob 414 of the second front toggle 323 (Figs. 18 and 19) and causes movement of toggle 323 to its "toed-in" or operate position and, immediately thereafter, the second cam 413 engages operating knob 415 of the first front toggle 175 (Figs. 20 and 21) and causes movement of toggle 175 back to its "toed-out" or normal position.

Rotation of crank arm 405 is completed when carriage 61 has been brought into position over the second tank 22 (Fig. 5) and as crank wheel 406 has now been removed from the ways 407 and 411, the lift rod assembly is allowed to drop and tray 142 is immersed in tank 22. It will be observed that, at such times as toggle 175 is in normal or "toed-out" position, further clockwise rotation of crank arm 405 is prevented by contact with stop arm 431 (Fig. 4). Similar stop arms are carried by the other toggles, for example stop arm 432 of toggle 323; their purpose is to prevent any accidental rotation of the respective crank arms.

As toggle 175 is moved to normal position, a corresponding movement is also caused of rear toggle 174 and the ultimate result is that clutch follow plate 173 is disengaged from clutch drive plate 172. Now as this happens, the energy stored up in spring 215 during setting of flywheel 183 and during the forward movement thereof is transmitted through the gears to block 185 and causes rotation thereof in a reverse direction which is effective to bring flywheel 183 back to its normal position in contact with stop plate 231.

When front toggle 323 was moved to its "toed-in" position it, of course, caused movement of rear toggle 326 to its corresponding "toed-out" position and this sets up a chain of operations similar to those previously described in reference to the first transfer mechanism which result in the starting of timer flywheel 332 along the associated timer screw.

The remaining treatment positions are automatically traversed in the general manner discussed above. This is, at the completion of an interval determined by the normal setting of timer flywheel 332 on the associated timer screw, crank arm 416 is rotated and, first, raises tray 142 out of tank 22, second, moves the carriage and lift rod assembly over the trolley rods to a position over tank 23 and drops tray 142 therein and, third, moves toggle 323 to normal position and toggle 324 to operate position. Each time tray 142 is lowered into a respective treatment tank, wheel 126 is brought into contact with agitator belt 111 and the tray is oscillated, i. e. a to-and-fro motion is imparted thereto, due to this contact as set forth above.

"Centering" of carriage 61 at each treatment stage is assured through registry of spring 433 carried by the carriage (Fig. 2) and the apertures in positioning plates 434, 435, 436, 437 and 438.

The automatic operation of the embodiment illustrated ceases when the tray is immersed in the last tank 25; it is contemplated that the tray will be removed from this last position manually.

While the machine disclosed by the drawings and described in detail above provides only five treatment positions and four automatic transfer mechanisms, it will be obvious that, inasmuch as each position is capable of independent timing to accommodate any particular cycle of events, more than five positions or less than five may be provided as dictated by the particular circumstances.

It is believed that the various valuable features of the mechanism will be readily apparent from the above description. However, it might be well to point that one advantageous feature resides in the fact that the timing arrangement is such that the timing screw need be constructed only with ordinary accuracy, i. e. just sufficient accuracy to assure a smooth running fit for the timer flywheel. This is due to the fact that the increment of time depends on the number of revolutions that the flywheel must go through before actuating the transfer crank arms. Timing is dependent upon the pitch of the screw thread of the timer screw. The maximum time that may be obtained is also adjustable and depends upon the length of the timing screw. The combination of pitch and length then gives a flexible immersion time that is adjustable in number of revolutions of the timing flywheel.

The provision of the coil springs as a part of the clutch operating mechanism is a particularly valuable feature as it provides a resilient coupling between parts of the mechanism which will prevent undue "forcing" should any abnormal obstruction be encountered. Further, the springs perform a major portion of the work expended in operation of the clutch plates all of which work would otherwise have to be directly expended through operation of the front toggle.

Another important feature resides in the spring means whereby each timer flywheel once it has completed its travel is automatically returned to its preset starting point in readiness for the next cycle of operations.

While a specific embodiment of the invention has been selected for illustration and detailed description, the invention is not, of course, limited in its application to such embodiment. For example, multiple operation of the machine may be attained by the provision of a succession of carrier trays rather than the single tray provided in the embodiment illustrated while the carriage track might be arranged to circle back upon itself so that the carriage might return to the first position without reversing its motion. In short the embodiment described should be taken as illustrative of the invention and not as restrictive thereof.

What is claimed is:

1. The combination, with apparatus for treating a plurality of crystals having a plurality of treatment stations, a tank at each of said stations, a liquid in each of said tanks, means for conveying a plurality of crystals to be treated and means for immersing the crystals in the liquid of each of said tanks in succession, of means for automatically controlling the movement of said conveying means whereby to fix the immersion interval for each of said tanks, comprising a source of rotational power, a clutch at each of said stations associated with said source of rotational power, a timing shaft actuatable by each of said clutches; a driving cage, having a plurality of parallel rods fixed therein, connected to said timing shaft; a stationary timing screw disposed within said driving cage; a flywheel, apertured for sliding passage therethrough of said parallel rods, threadably engaging said timing screw; a crank plate secured to one end of said timing screw and arranged to be engaged by said flywheel at one end of its traverse relative to said timing screw, a follower crank plate positioned coaxially with said crank plate and arranged for resilient rotational connection thereto; a stub shaft connected to said follower crank plate, a crank block fixed on said stub shaft, and a crank arm extending from said crank block and arranged for engagement with said means for conveying a plurality of crystals to be treated from one of said stations to a succeeding one of said stations.

2. The combination, with apparatus for treating a plurality of crystals having a plurality of treatment stations, a tank at each of said stations, a liquid in each of said tanks, means for conveying a plurality of crystals to be treated, means for immersing the crystals in the liquid of each of said tanks in succession, and means effective when the crystals are immersed in the liquid of any of said tanks for imparting a to-and-fro motion to the crystals during the immersion interval, of means for automatically controlling the movement of said conveying means whereby to fix the immersion interval for each of said tanks, comprising a constant speed source of rotational power, a clutch at each of said stations associated with said source of rotational power, a timing shaft actuatable by each of said clutches; a driving cage having a plurality of parallel rods fixed therein connected to said timing shaft; a stationary timing screw disposed within said driving cage; a flywheel, apertured to permit sliding engagement of said parallel rods, threadably engaging said timing screw; means for defining the initial position of said flywheel axially of said timing screw; a crank plate secured to one end of said timing screw, a follower crank plate positioned coaxially with said crank plate and arranged for resilient rotational connection thereto; a stub shaft connected to said follower crank plate, a crank block fixed on said stub shaft, and a crank arm extending from said crank block arranged for engagement with said means for conveying a plurality of crystals to be treated from one of said stations to a succeeding one of said stations.

3. The combination, with apparatus for treating a plurality of piezoelectric crystals by etching having a plurality of treatment stations, a tank at each of said stations, a liquid in each of said tanks, the liquid in at least one of said tanks being an etching solution, a tray for mounting a plurality of piezoelectric crystals to be treated, a track positioned above said tanks, a carriage movable along said track, and means for so supporting said tray from said carriage that the tray may be raised above the level of said tanks and lowered below the level of said tanks whereby to clear said tanks or to immerse the crystals in the liquid of the particular tank, of a plurality of transfer mechanisms, each of said transfer mechanisms including transfer means effective to raise said tray above the level of one of said tanks, to move said carriage and said tray to a position above the next succeeding tank and to lower said tray into said next succeeding tank, and control means associated with each of said transfer mechanisms for automatically causing the operation of the respective transfer means at a predetermined time, comprising a main driving shaft arranged to be driven at constant rotational speed, a clutch at each of said stations associated with said main driving shaft, a timing shaft at each of said stations actuatable by each of said clutches, a driving cage connected to said timing shaft and having a plurality of parallel driving rods fixed therein; a stationary timing screw within said driving cage; a flywheel, apertured to receive said rods and to permit free sliding movement of said flywheel along said driving rods, threadably engaging said timing screw; means for defining the initial position of said flywheel axially of said timing screw, a crank plate secured to one end of said timing screw, a follower crank plate positioned coaxially with said crank plate and arranged for resilient rotational connection thereto; and means connected to said follower crank plate for elevating said crank and traversing said carriage from one of said stations to the next of said stations, comprising a stub shaft connected to said follower crank plate, a crank arm associated with said stub shaft, means disposed on said arm for engaging supporting means associated with said tray and for effecting vertical displacement of said supporting means, and for effecting horizontal displacement thereof along said track, and means for indicating the time interval of operation at each of said stations.

4. The combination, with apparatus for changing the resonant frequency of a plurality of piezoelectric crystals by etching having a plurality of treatment stations, a tank at each of said stations, a liquid in each of said tanks, the liquid in at least one of said tanks being an etching solution, a tray for holding a plurality of piezoelectric crystals to be treated, a track positioned above said tanks, a carriage movable along said track, vertically traversable means for supporting said tray from said carriage, and means for effecting controllable movement of said tray from one of said stations to a succeeding one of said stations, comprising a constant speed source of rotational power, timing means at each of said stations arranged to be driven by said source, a clutch at each of said stations arranged to connect said source selectively to said timing means, means for predetermining the interval during which each of said timing means is to be operable, and means operable at the end of said interval for effecting transmission of power from said source through said timing means; means actuatable by power transmitted positively from said source through said timing means for lifting said tray from said tank, effecting traversal along said track to a succeeding one of said stations, and lowering said tray into the one of said tanks associated with said succeeding station; lever assemblies associated with each of said stations arranged to close and to open said clutch, and means associated with said means for supporting said tray for engaging one of said lever assemblies on entering a treatment station and the other on leaving that station.

5. The combination, with apparatus for changing the resonant frequency of a plurality of piezoelectric crystals by etching having a series of adjacent treatment stations, a tank at each of said stations, at least one of said tanks containing an etching solution, conveying mechanism associated with said tanks including a stationary track disposed above said tanks and a carriage movable laterally along said track, a holder for a plurality of piezoelectric crystals being treated, vertically shiftable means for supporting said holder from said carriage, and a source of constant speed rotational power associated with each of said stations, of a plurality of transfer mechanisms each effective at respective timed intervals to raise said holder out of one of said tanks, to move said holder while in raised position and while supported by said carriage to a position in registry with the next succeeding tank in the series and to lower said holder into said last-mentoned tank, each of said transfer mechanisms comprising a stationary timer screw, a timer flywheel rotatable upon and laterally movable along said timer screw, a clutch comprising a clutch drive plate driven by said common driving means and a clutch follower plate normally out of driving engagement with the clutch drive plate, means for operatively coupling said timer flywheel and said clutch follower plate, spring means effective when activated to bring said clutch drive plate and said clutch follower plate into driving engagement, a rotatable transfer crank arm, a crank plate arranged to be operatively engaged by said timer flywheel a follower crank plate resiliently connected to said crank plate, a crank arm connected to said follower crank plate, a floating means for controlling the activation of said spring means, means carried by said crank arm effective when said arm is rotated to engage and raise said holder, additional means carried by said crank arm and effective when said arm is rotated to engage and operate in succession the toggle means of two adjacent transfer mechanisms, and means for fixing the normal starting position of said flywheel on said timer screw, the normal starting position of each of said timer flywheels being adjustable independently of each of the other flywheels.

6. The combination with apparatus for changing the resonant frequency of a plurality of piezoelectric crystals by etching having a series of adjacent treatment stations, a tank at each of said stations, at least one of said tanks containing an etching solution, conveying mechanism associated with said tank including a stationary track disposed above said tanks and a carriage movable laterally along said track, a holder for a plurality of piezoelectric crystals being treated, vertically shiftable means for supporting said holder from said carriage, of a plurality of transfer mechanisms each effective at respective timed intervals to raise said holder out of one of said tanks, to move said holder while in raised position and while supported by said carriage to a position in registry with the next succeeding tank in the series and to lower said holder into said last-mentioned tank, and a common driving means for all of said transfer mechanisms, each of said transfer mechanisms comprising a stationary timer screw, a timer flywheel rotatable upon and laterally movable along said timer screw, a clutch comprising a clutch drive plate driven by said common driving means and a clutch follower plate normally out of driving engagement with the clutch drive plate, means for operatively coupling said timer flywheel and said clutch follower plate, spring means effective when activated to bring said clutch drive plate and said clutch follower plate into driving engagement whereby to cause rotation of said flywheel and lateral movement thereof along said timer screw, a rotatable transfer crank arm, means effective upon said timer flywheel reaching a definite point on the timer screw to operatively couple said crank arm to said flywheel whereby to cause rotation of said crank arm, toggle means for controlling the activation of said spring means, means carried by said crank arm effective during rotation of said arm to engage and raise said holder and to move said carriage to a position in registry with the next adjacent tank, additional means carried by said crank arm and effective at a further point in its rotation to engage the toggle means of the adjacent transfer mechanism and to move it to spring activating position, additional means carried by said crank arm and effective at a still further point in its rotation to engage the toggle means of the instant transfer mechanism and to move it to normal position, and means for fixing the normal starting position of said flywheel on said timer screw, the normal starting position of each of said timer flywheels being adjustable independently of each of the other flywheels.

7. The combination with apparatus for changing the resonant frequency of a plurality of piezoelectric crystals by etching having a series of adjacent treatment stations, a tank at each of said stations, at least one of said tanks containing an etching solution, conveying mechanism associated with said tanks including a stationary track disposed above said tanks and a carriage movable laterally along said track, a holder for a plurality of piezoelectric crystals being treated, and vertically shiftable means for supporting said holder from said carriage, of a plurality of transfer mechanisms each effective at respective timed intervals to raise said holder out of one of said tanks, to move said holder while in raised position and while supported by said carriage to a position in registry with the next succeeding tank in the series and to lower said holder into said last-mentioned tank, and a common driving means for all of said transfer mechanisms, each of said transfer mechanisms comprising a stationary timer screw, a timer flywheel rotatable upon and laterally movable along said timer screw, a clutch comprising a clutch drive plate driven by said common driving means and a clutch follower plate normally out of driving engagement with the clutch drive plate, means including a timing shaft for operatively coupling said timer flywheel and said clutch follower plate, spring means effective when activated to bring said clutch drive plate and said clutch follower plate into driving engagement whereby to cause rotation of said flywheel and lateral movement thereof along said timer screw, a rotatable transfer crank arm, means effective upon said timer flywheel reaching a definite point on the timer screw to operatively couple said crank arm to said flywheel whereby to cause rotation of said crank arm, toggle means for controlling the activation of said spring means, means carried by said crank arm effective when said arm is rotating to engage and raise said holder and to move said carriage to a position in registry with the next adjacent tank, means for fixing the normal starting position of said flywheel on said timer screw, means effective upon completion of one rotation of said crank arm for causing disengagement of said clutch drive plate and said clutch follower plate, and means effective upon disengagement of said drive plate and said follower plate for returning said flywheel to its normal starting position, comprising a resilient member arranged to be stressed during operative coupling of said timer flywheel and said clutch follower plate, and to drive said timer flywheel in the reverse direction upon release of such operative coupling.

8. In combination with apparatus substantially as described in claim 1, means for indicating the length of time predetermined for operations at each of said stations, comprising a gear train driven by said timing shaft, and indicating means associated with said gear train calibrated in relation to the number of turns of said timing shaft necessary to move the flywheel from its position at any instant to the position of engagement with said crank plate.

FRANK CAROSELLI.

REFERENCES CITED

The following references are of record in the file of this patent:

UNITED STATES PATENTS

| Number | Name | Date |
|---|---|---|
| 1,970,850 | Hannon | Aug. 21, 1934 |
| 2,222,839 | Hall et al. | Nov. 26, 1940 |
| 2,461,113 | Friedman | Feb. 8, 1949 |

FOREIGN PATENTS

| Number | Country | Date |
|---|---|---|
| 508,246 | Great Britain | June 28, 1939 |